(12) United States Patent
Lin et al.

(10) Patent No.: US 11,312,216 B1
(45) Date of Patent: Apr. 26, 2022

(54) LOCKING STRUCTURE OF VEHICLE COVER

(71) Applicant: Hangzhou Golden Sun Auto Parts Co., LTD., Hangzhou (CN)

(72) Inventors: Chenshan Lin, Hangzhou (CN); Shaoyong Zheng, Hangzhou (CN); Jinqin Fu, Hangzhou (CN); Xue'e Wang, Hangzhou (CN); Xiaohong Tang, Hangzhou (CN)

(73) Assignee: Hangzhou Golden Sun Auto Parts Co., LTD., Hangzhou (CN)

( * ) Notice: Subject to any disclaimer, the term of this patent is extended or adjusted under 35 U.S.C. 154(b) by 0 days.

(21) Appl. No.: 17/139,381

(22) Filed: Dec. 31, 2020

(30) Foreign Application Priority Data

Nov. 13, 2020 (CN) .......................... 202011268490.5

(51) Int. Cl.
*B60J 7/19* (2006.01)
*B60J 10/90* (2016.01)
*B60J 7/14* (2006.01)

(52) U.S. Cl.
CPC ................ *B60J 7/19* (2013.01); *B60J 7/141* (2013.01); *B60J 10/90* (2016.02)

(58) Field of Classification Search
CPC ..... B60J 7/19; B60J 7/198; B60J 7/085; B60J 7/10; B60J 7/14; B60J 7/068; B60J 7/12; B60J 7/141; B60J 10/90
USPC .......................... 296/224, 100.07, 98, 100.09
See application file for complete search history.

(56) References Cited

U.S. PATENT DOCUMENTS

| 6,076,881 | A | * | 6/2000 | Tucker | B60J 7/141 296/100.07 |
| 6,095,588 | A | * | 8/2000 | Rodosta | B60J 7/141 296/100.09 |
| 6,149,220 | A | * | 11/2000 | Weldy | B60J 7/1621 296/100.06 |
| 2012/0056450 | A1 | * | 3/2012 | DiMario | B60J 1/006 296/224 |
| 2019/0118629 | A1 | * | 4/2019 | Spencer | B60J 7/198 |

FOREIGN PATENT DOCUMENTS

| CN | 110481292 A | * | 11/2019 | .............. B60J 7/198 |
| CN | 111645501 A | | 9/2020 | |
| DE | 19716699 A1 | * | 10/1998 | .............. B60J 7/198 |

* cited by examiner

*Primary Examiner* — Jason S Morrow
*Assistant Examiner* — Wenwei Zhuo
(74) *Attorney, Agent, or Firm* — Schwegman Lundberg & Woessner, P.A.

(57) ABSTRACT

A locking structure of a vehicle cover includes a vehicle cover, at least two mounting rods, a depressor and a torsion spring. The mounting rods are arranged in parallel. The vehicle cover is laid on the mounting rods. The depressor is rotatably mounted on the mounting rods through the torsion spring, and cooperates with the mounting rods to clamp the vehicle cover. The depressor is installed on the mounting rods through the spring, and the cover is clamped between the rod and the depressor by the depressor, so that the spring always has a tendency to drive the depressor to clamp the rod, and the cover is pressed against the rods, which means the cover is fixed on the rods, so that a connection between the cover and the rods is more stable and it is not easy for the cover to shake off from the rods.

7 Claims, 4 Drawing Sheets

LOCKING STRUCTURE OF VEHICLE COVER

CROSS-REFERENCE TO RELATED APPLICATIONS

This Non-provisional application claims priority under 35 U.S.C. § 119(a) to Chinese Patent Application No. 202011268490.5 filed on Nov. 13, 2020, the entire contents of which are hereby incorporated by reference in their entirety.

TECHNICAL FIELD

The disclosure relates to the field of automobile parts, in particular to a locking structure of a vehicle cover.

BACKGROUND ART

Nowadays, in order to transport goods in rainy and snowy weather, a pickup truck generally is chosen to be installed with a cover on its cargo bed for waterproofing. A fully-embedded vehicle cover used in the cargo bed of the pickup truck is provided in Patent CN111645501A, for which there is a problem during its use that several cover plates of this vehicle cover are pressed against above a rail arrangement with their own gravity, and thus when a severe bumping is encountered, the vehicle cover will shake off from the rail arrangement, which results in a poor stability.

SUMMARY

In view of the above problems, the present disclosure provides a locking structure of a vehicle cover.

Technical schemes adopted in the disclosure is as follows.

The locking structure of the vehicle cover includes a vehicle cover, at least two mounting rods, a depressor and a torsion spring. The mounting rods are arranged in parallel. The vehicle cover is laid on the mounting rods. The depressor is rotatably mounted on the mounting rods through the torsion spring and cooperates with the mounting rods to clamp the vehicle cover.

In this structure, the depressor is installed on the mounting rods through the torsion spring, and the vehicle cover is clamped between the mounting rods and the depressor by the depressor, so that the vehicle cover is pressed against the mounting rods, and the torsion spring always has a tendency to drive the depressor to clamp the mounting rod, which means the vehicle cover is fixed on the mounting rods, so that a connection between the vehicle cover and the mounting rods is more stable and it is not easy for the vehicle cover to shake off from the mounting rods.

Optionally, the vehicle cover includes a plurality of profiles, a plurality of connecting rubber strips, an edge rubber strip, a first joint and a second joint. The profiles are rotationally sealed and fixed together through the connecting rubber strips. The edge rubber strip is fixed on the profiles through the first joint and the second joint. The edge rubber strip is perpendicular to the connecting rubber strips, and the connecting rubber strips are parallel to the profiles. The depressor and the mounting rod are used for clamping the first joint and the second joint.

The profiles along with the connecting rubber strips form an overall framework of the whole vehicle cover, while the edge rubber strip mainly serves to block rain and prevent rainwater from flowing through a binding between the mounting rods and the vehicle cover. The depressor and the mounting rods clamp the first joint and the second joint. In this way a damage to the profiles, the connecting rubber strips and the edge rubber strip can be avoided, thus ensuring an integrity of the overall framework of the whole vehicle cover and preventing the rainwater from seeping in.

Optionally, it also includes a pressing member which is fixed on the depressor. An end of a torsion spring directly or indirectly abuts against the pressing member, and the other end of the torsion spring directly or indirectly abuts against the mounting rod.

The pressing member is set to press and adjust the depressor conveniently.

Optionally, it also includes an end cap which is installed on the mounting rod and located at an end of the mounting rod, and the end cap is used for preventing the pressing member and the depressor from slipping off the mounting rod.

Optionally, the end caps are fixedly arranged at two ends of the mounting rod.

Optionally, two torsion springs are respectively arranged at two ends of the depressor.

Two torsion springs are set to improve a stability of the depressor during rotation. Specifically, an end of the torsion spring can abut against the pressing member or depressor, and the other end of the torsion spring can abut against the mounting rod or the end cap.

Optionally, it also includes a steel wire bar and a stop block. The steel wire bar is fixed on the stop block and is parallel to the depressor and the mounting rod. The stop block is arranged on the mounting rod. The steel wire bar is rotationally clamped between the stop block and the mounting rods.

Specifically, the limit block is slidably clamped on the mounting rod and can slide over a certain distance on the mounting rod. However, due to a blocking effect of the end cap or the pressing member, the limit block cannot slide out of the mounting rod, thus reducing friction resistance between the steel wire strip and the limit block during rotation of the depressor, and making the depressor rotate more smoothly.

Optionally, the pressing member is fixedly installed on the depressor by screws.

The disclosure presents beneficial effects that: the depressor is installed on the mounting rods through the torsion spring, and the vehicle cover is clamped between the mounting rod and the depressor by the depressor, so that the torsion spring always has a tendency to drive the depressor to clamp the mounting rod, and the vehicle cover is pressed against the mounting rods, which means the vehicle cover is fixed on the mounting rods, so that a connection between the vehicle cover and the mounting rods is more stable and it is not easy for the vehicle cover to shake off from the mounting rods.

Figure 1:
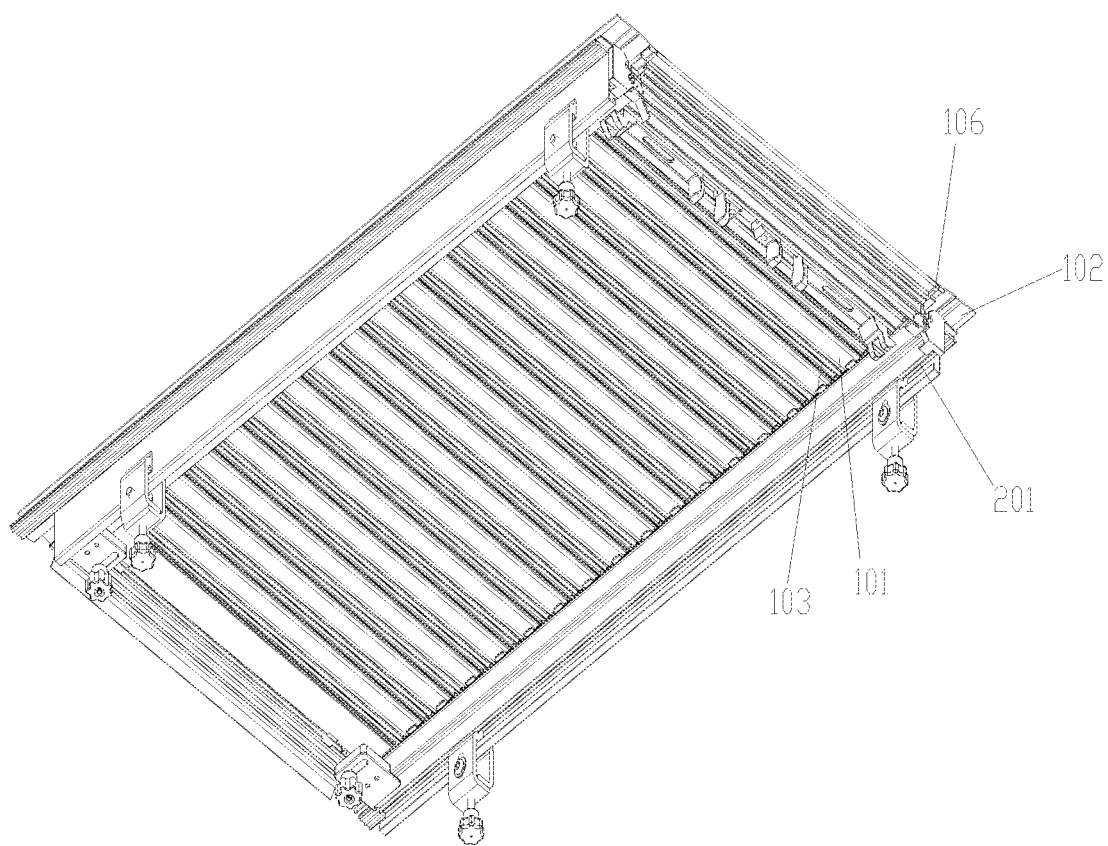
FIG. 1 is a structural schematic diagram of a locking structure of a vehicle cover according to the disclosure.

The reference numerals in the figures are: 101. Profiles, 102. Edge Rubber Strip, 103. Connecting Rubber Strip, 104. First Joint, 105. Screw, 106. Second Joint, 201. Mounting Rod, 301. Depressor, 302. End Cap, 303. Torsion Spring, 304. Stop Block, 305, Mounting Rubber Strip, 306. Steel Wire Bar, 307. Pressing Member.

DETAILED DESCRIPTION OF PREFERRED EMBODIMENTS

The present disclosure will be described in detail with reference to the accompanying drawings.

Figure 3:
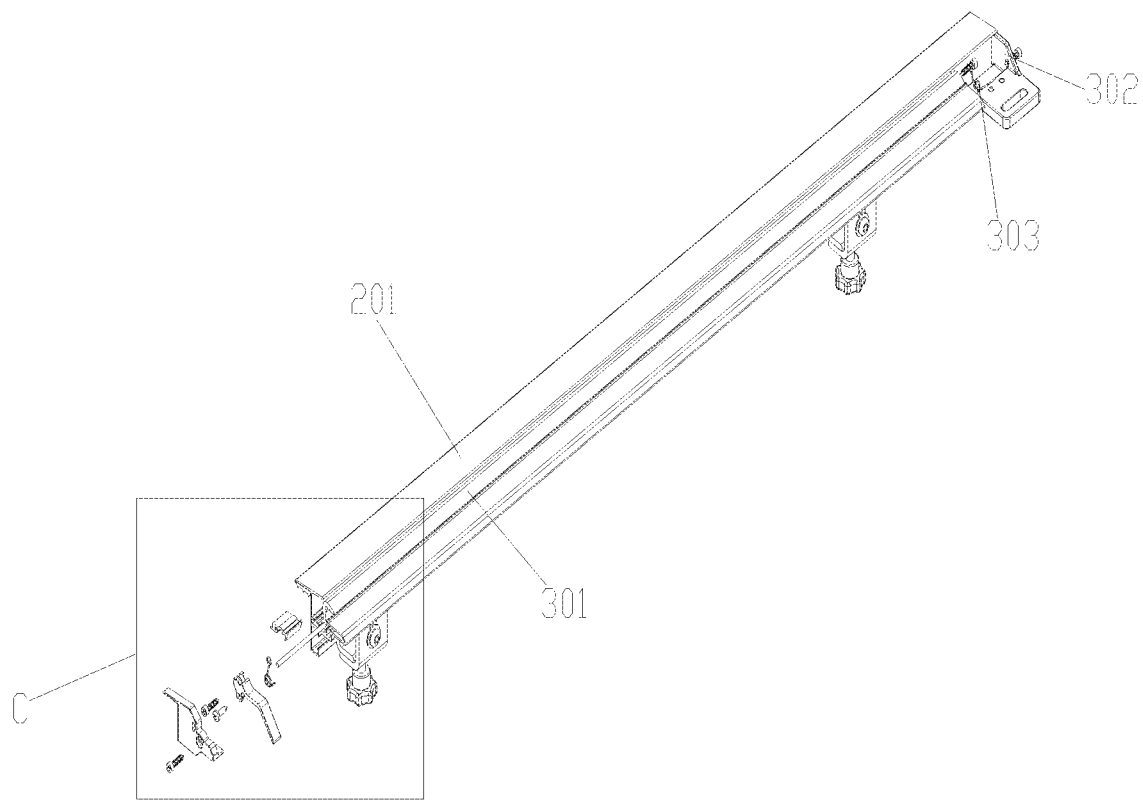
FIG. 3 is a schematic diagram of a connection relationship between various parts on the mounting rod.
Figure 4:
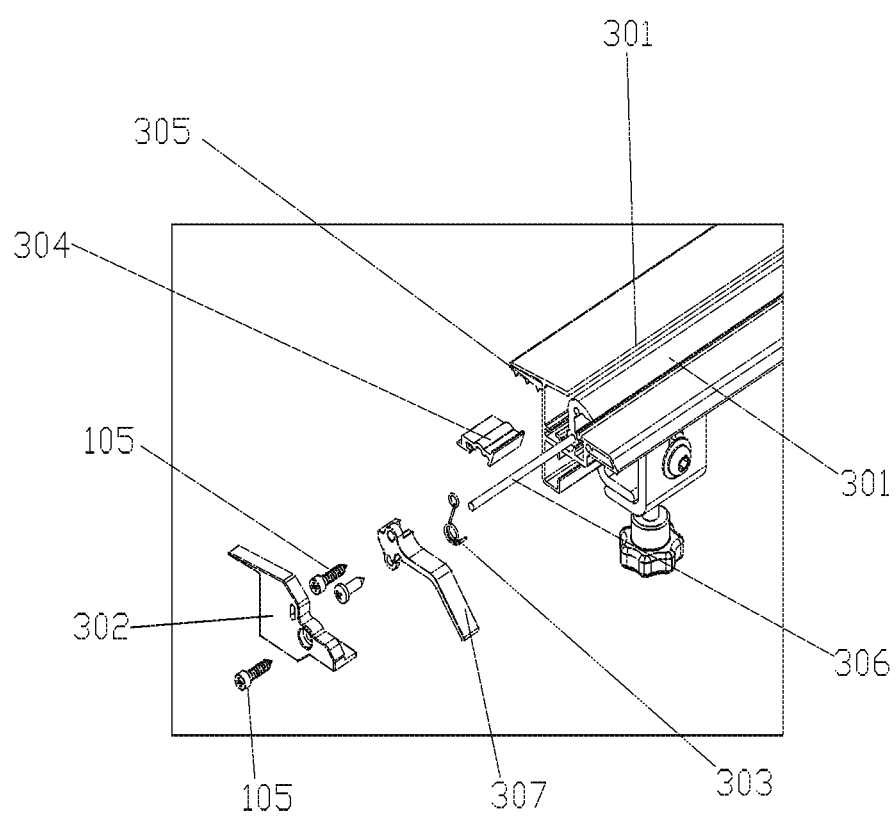
FIG. 4 is an enlarged schematic diagram at C in FIG. 3.

As shown in FIGS. 1, 3 and 4, a locking structure of a vehicle cover includes a vehicle cover, at least two mounting rods 201, a depressor 301 and a torsion spring 303. The mounting rods 201 are arranged in parallel. The vehicle cover is laid on the mounting rods 201. The depressor 301 are rotatably mounted on the mounting rods 201 through the torsion spring 303 and cooperates with the mounting rods 201 to clamp the vehicle cover.

In this structure, the depressor 303 is installed on the mounting rods 201 through the torsion spring 301, and the vehicle cover is clamped between the mounting rods 201 and the depressor 301 by the depressor 301, so that the vehicle cover is pressed against the mounting rods 201, which means the vehicle cover is fixed on the mounting rods 201, so that a connection between the vehicle cover and the mounting rods 201 is more stable and it is not easy for the vehicle cover to shake off from the mounting rods 201.

Figure 2:
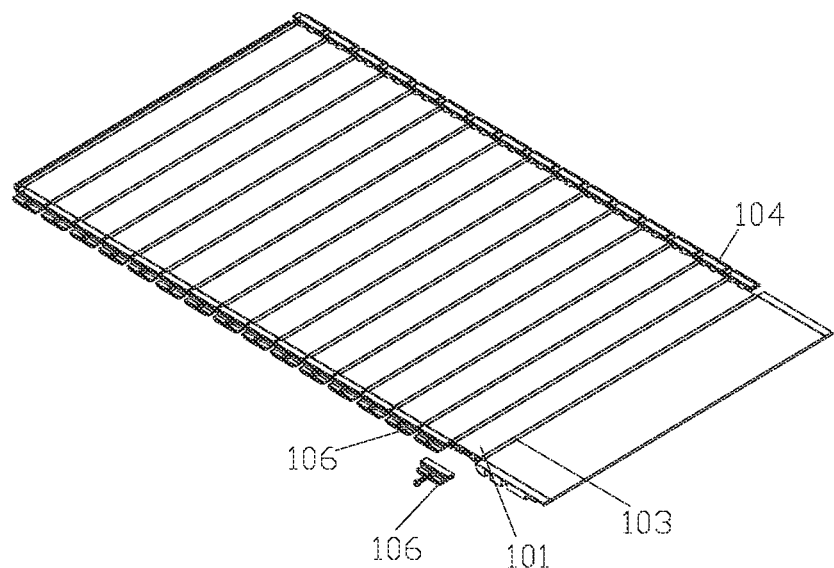
FIG. 2 is a structural schematic diagram of a vehicle cover according to the disclosure.

As shown in FIGS. 1 and 2, the vehicle cover includes a plurality of profiles 101, a plurality of connecting rubber strips 103, an edge rubber strip 102, a first joint 104 and a second join 106. The profiles 101 are rotationally sealed and fixed together through the connecting rubber strips 103. The edge rubber strip 102 is fixed on the profiles 101 through the first joint 104 and the second joint 106. The edge rubber strip 102 is perpendicular to the connecting rubber strips 103, and the connecting rubber strips 103 are parallel to the profiles 101. The depressor 301 and the mounting rod 201 are used for clamping the first joint 104 and the second joint 106.

The profiles 101 along with the connecting rubber strips 103 form an overall framework of the whole vehicle cover, while the edge rubber strip 102 mainly serves to block rain and prevent rainwater from flowing through a binding between the mounting rods and the vehicle cover. The depressor 301 and the mounting rods 201 clamp the first joint 104 and the second joint 106. In this way a damage to the profiles 101, the connecting rubber strips 103 and the edge rubber strip 102 can be avoided, thus ensuring an integrity of the overall framework of the whole vehicle cover and preventing the rainwater from seeping in.

Figure 5:
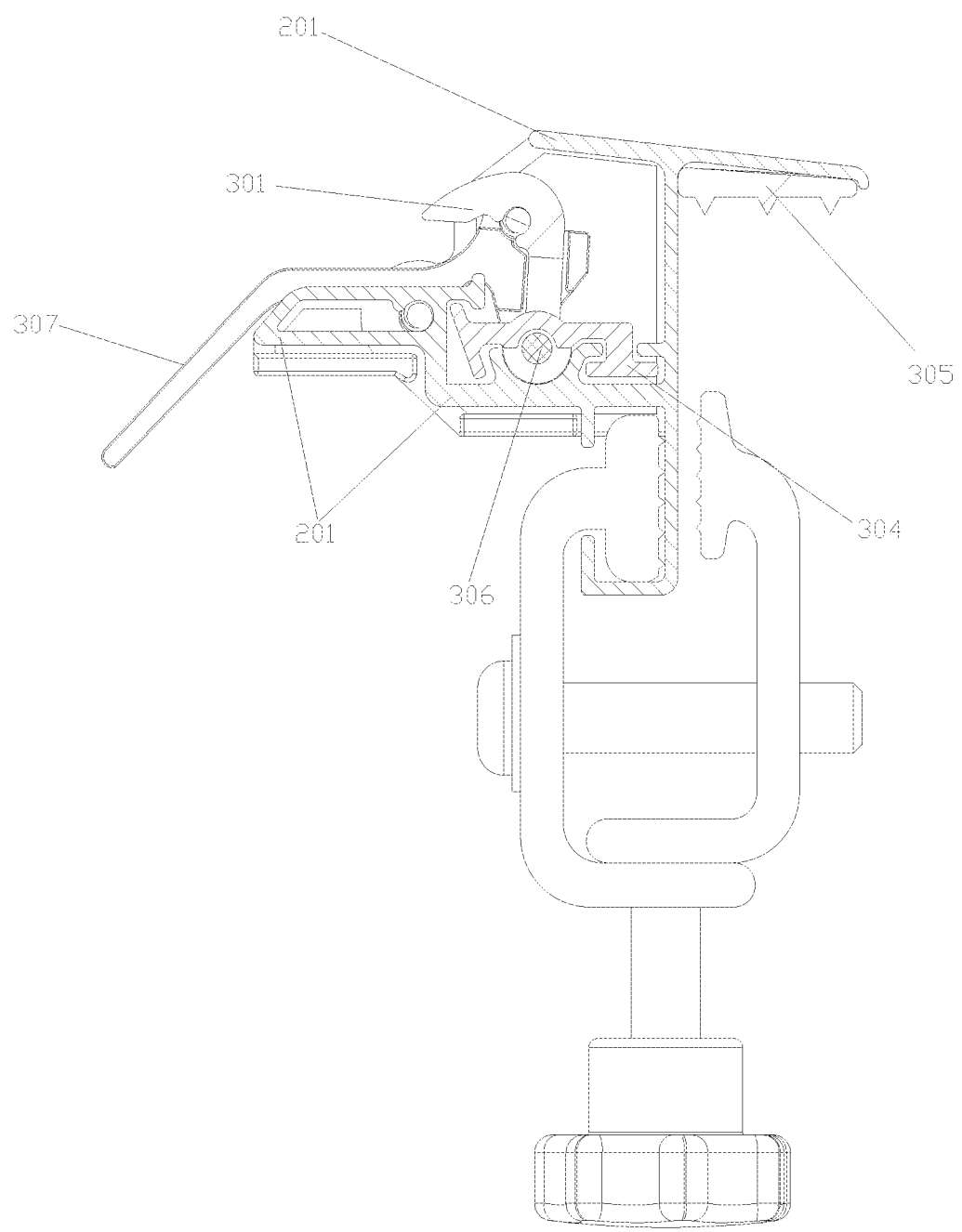
FIG. 5 is a schematic diagram of a matching relationship between the mounting rod and the depressor.

As shown in FIGS. 3, 4 and 5, it also includes a pressing member 307 which is fixed on the depressor 301. An end of the torsion spring 303 directly or indirectly abuts against the pressing member 307, and the other end of the torsion spring 303 directly or indirectly abuts against the mounting rod 201.

The pressing member 307 is set to press and adjust the depressor conveniently 301.

As shown in FIGS. 3, 4 and 5, it also includes an end cap 302 which is installed on the mounting rod 201 and located at an end of the mounting rod 201, and the end cap 302 is used for preventing the pressing member 307 and the depressor 301 from slipping off the mounting rod 201.

As shown in FIGS. 3, 4 and 5, the end caps 302 are fixedly arranged at two ends of the mounting rod 201.

As shown in FIGS. 3, 4 and 5, two torsion springs 303 are respectively arranged at two ends of the depressor 301.

Two torsion springs 303 are set to improve a stability of the depressor 301 during rotation. Specifically, an end of the torsion spring 303 can abut against the pressing member 307 or depressor 301, and the other end of the torsion spring 303 can abut against the mounting rod 201 or the end cap 302.

As shown in FIGS. 3, 4 and 5, it also includes a steel wire bar 306 and a stop block 304. The steel wire bar 306 is fixed on the stop block 304 and is parallel to the depressor and the mounting rods 201. The stop block 304 is arranged on the mounting rods 201. The steel wire bar 306 is rotationally clamped between the stop block 304 and the mounting rods 201.

Specifically, the limit block 304 is slidably clamped on the mounting rods 201 and can slide over a certain distance on the mounting rods 201. However, due to a blocking effect of the end cap 302 or the pressing member 307, the limit block 304 cannot slide out of the mounting rods 201, thus reducing friction resistance between the steel wire strip 306 and the limit block 304 during rotation of the depressor 301, and making the depressor 301 rotate more smoothly.

As shown in FIGS. 3, 4 and 5, the pressing member 307 is fixedly installed on the depressor 301 by screws 105.

As shown in FIG. 5, the mounting rod 201 is also provided with a mounting rubber strip 305, and the mounting rod 201 are closely attached to the cargo bed of the pickup truck through the mounting rubber strip.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A locking structure of a vehicle cover, comprising:
a vehicle cover;
at least two mounting rods;
a depressor;
a torsion spring;
a steel wire bar; and
a stop block,
wherein the mounting rods are arranged in parallel, the vehicle cover is laid on the mounting rods, and the depressor is rotatably mounted on one of the at least two mounting rods through the torsion spring, and cooperates with the mounting rods to clamp the vehicle cover,
wherein the steel wire bar is fixed on the stop block and is parallel to the depressor and the at least two mounting rods, the stop block is arranged on the mounting rods, and the steel wire bar is rotationally clamped between the stop block and one of the at least two mounting rods.

2. The locking structure of the vehicle cover according to claim 1, wherein the vehicle cover comprises a plurality of profiles, a plurality of connecting rubber strips, an edge rubber strip, a first joint and a second joint, wherein the profiles are rotationally sealed and fixed together through the connecting rubber strips, the edge rubber strip is fixed on the profiles through the first joint and the second joint, the edge rubber strip is perpendicular to the connecting rubber strips, the connecting rubber strips are parallel to the profiles, and the depressor and the at least two mounting rods are used for clamping the first joint and the second joint.

3. The locking structure of the vehicle cover according to claim 1, further comprising a pressing member which is fixed on the depressor,
   wherein an end of the torsion spring directly or indirectly abuts against the pressing member, and an other end of the torsion spring directly or indirectly abuts against the at least two mounting rods.

4. The locking structure of the vehicle cover according to claim 3, further comprising an end cap which is installed on each of the mounting rods and located at an end of the mounting rods,
   wherein the end cap is used for preventing the pressing member and the depressor from slipping off the mounting rods.

5. The locking structure of the vehicle cover according to claim 4, wherein the end caps are fixedly arranged at two ends of the mounting rods.

6. The locking structure of the vehicle cover according to claim 4, wherein two torsion springs are respectively arranged at two ends of the depressor.

7. The locking structure of the vehicle cover according to claim 3, wherein the pressing member is fixedly installed on the depressor by screws.

\* \* \* \* \*